(12) United States Patent
Yasumoto

(10) Patent No.: US 10,698,253 B2
(45) Date of Patent: Jun. 30, 2020

(54) FRONT PANEL FOR DISPLAY DEVICE AND DISPLAY DEVICE

(71) Applicant: ALPINE ELECTRONICS, INC., Tokyo (JP)

(72) Inventor: Takashi Yasumoto, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 37 days.

(21) Appl. No.: 16/142,203

(22) Filed: Sep. 26, 2018

(65) Prior Publication Data

US 2019/0113803 A1 Apr. 18, 2019

(30) Foreign Application Priority Data

Oct. 16, 2017 (JP) .................................. 2017-200506

(51) Int. Cl.
| | | |
|---|---|---|
| *G02F 1/1335* | (2006.01) | |
| *G02F 1/1333* | (2006.01) | |
| *G02B 5/30* | (2006.01) | |
| *F21V 8/00* | (2006.01) | |

(52) U.S. Cl.
CPC ..... *G02F 1/133528* (2013.01); *G02B 5/3025* (2013.01); *G02B 6/0056* (2013.01); *G02F 1/133308* (2013.01); *G02F 2001/133331* (2013.01); *G02F 2001/133531* (2013.01); *G02F 2203/11* (2013.01)

(58) Field of Classification Search
CPC ... G02F 1/133528; G02F 2001/133531; G02F 1/13362; G02F 2001/133331; G02F 2203/11; G02B 5/3025; G02B 6/0056; G02B 5/3033; G02B 27/26; Y10T 428/1041

See application file for complete search history.

(56) References Cited

U.S. PATENT DOCUMENTS

| | | | | |
|---|---|---|---|---|
| 2012/0105400 A1* | 5/2012 | Mathew | ............... | H04N 5/2251 345/207 |
| 2012/0243091 A1* | 9/2012 | Amm | .................... | G06F 1/1605 359/489.07 |
| 2016/0195905 A1* | 7/2016 | Wang | .................... | G06F 1/1684 361/679.21 |
| 2019/0079236 A1* | 3/2019 | Hung | .................... | G02B 5/3083 |
| 2019/0089880 A1* | 3/2019 | Murao | ................. | H04N 5/2257 |

FOREIGN PATENT DOCUMENTS

| | | |
|---|---|---|
| JP | 2008-241807 | 10/2008 |
| JP | 2015-200843 | 11/2015 |
| JP | 2017-049469 | 3/2017 |
| WO | 2013/094476 | 6/2013 |

\* cited by examiner

*Primary Examiner* — Jia X Pan
(74) *Attorney, Agent, or Firm* — IPUSA, PLLC

(57) ABSTRACT

There is provision of a front panel for a display device including a display region and a non-display region adjacent to the display region. The front panel for the display device includes a transparent plate, a decorative layer formed on an area of a back surface of the transparent plate corresponding to the non-display region except for an area of an optical path of infrared light, and a first polarizing plate polarizing visible light provided at a front surface side or a back surface side of the transparent plate, which is disposed at a region including the optical path of infrared light.

6 Claims, 7 Drawing Sheets

FRONT PANEL FOR DISPLAY DEVICE AND DISPLAY DEVICE

CROSS-REFERENCE TO RELATED APPLICATIONS

This patent application is based upon and claims priority to Japanese Patent Application No. 2017-200506 filed on Oct. 16, 2017, the entire contents of which are incorporated herein by reference.

BACKGROUND OF THE INVENTION

1. Field of the Invention

The present invention generally relates to a front panel for a display device, and a display device.

2. Description of the Related Art

A technique for monitoring a condition of a driver of a vehicle has been proposed, in which infrared devices (an IR LED and an IR camera) are embedded in a display device installed in a vehicle, and in which emission and reception of infrared light (which may also be referred to as "IR") are performed. In such a display device, a transmitting area for transmitting IR is provided on a part of a front panel for the display device, on which decorative print is applied, and the emission and reception of IR are performed through the transmitting area.

However, in the above mentioned display device, a transmitting area provided on the display device impairs appearance of the display device. Specifically, an infrared device (which may also be referred as an "IR device") embedded in the display device is seen from outside through the transmitting area. Even if the display device is configured such that an IR device cannot be seen from outside through the transmitting area, a borderline between the transmitting area and an area on which decorative print is applied is conspicuous, which causes a problem of losing unity of color.

CITATION LIST

Patent Document

[Patent Document 1] Japanese Laid-open Patent Publication No. 2017-049469
[Patent Document 2] International Publication Pamphlet No. WO 2013/094476
[Patent Document 3] Japanese Laid-open Patent Publication No. 2015-200843
[Patent Document 4] Japanese Laid-open Patent Publication No. 2008-241807

SUMMARY OF THE INVENTION

The present invention is made in light of the above problems, and aims at improving appearance characteristics of a display device embedding an IR device.

According to an aspect of embodiments, there is provision of a front panel for a display device including a display region and a non-display region adjacent to the display region. The front panel for the display device includes a transparent plate, a decorative layer formed on an area of a back surface of the transparent plate corresponding to the non-display region except for an area of an optical path of infrared light, and a first polarizing plate polarizing visible light provided at a front surface side or a back surface side of the transparent plate, which is disposed at a region including the optical path of infrared light.

DETAILED DESCRIPTION OF EMBODIMENTS

In the following, embodiments of the present invention will be described with reference to the drawings. Note that in the following descriptions and the drawings, elements having substantially identical features are given the same reference symbols and overlapping descriptions may be omitted.

First Embodiment

<Exterior of Display Device>

Figure 1:
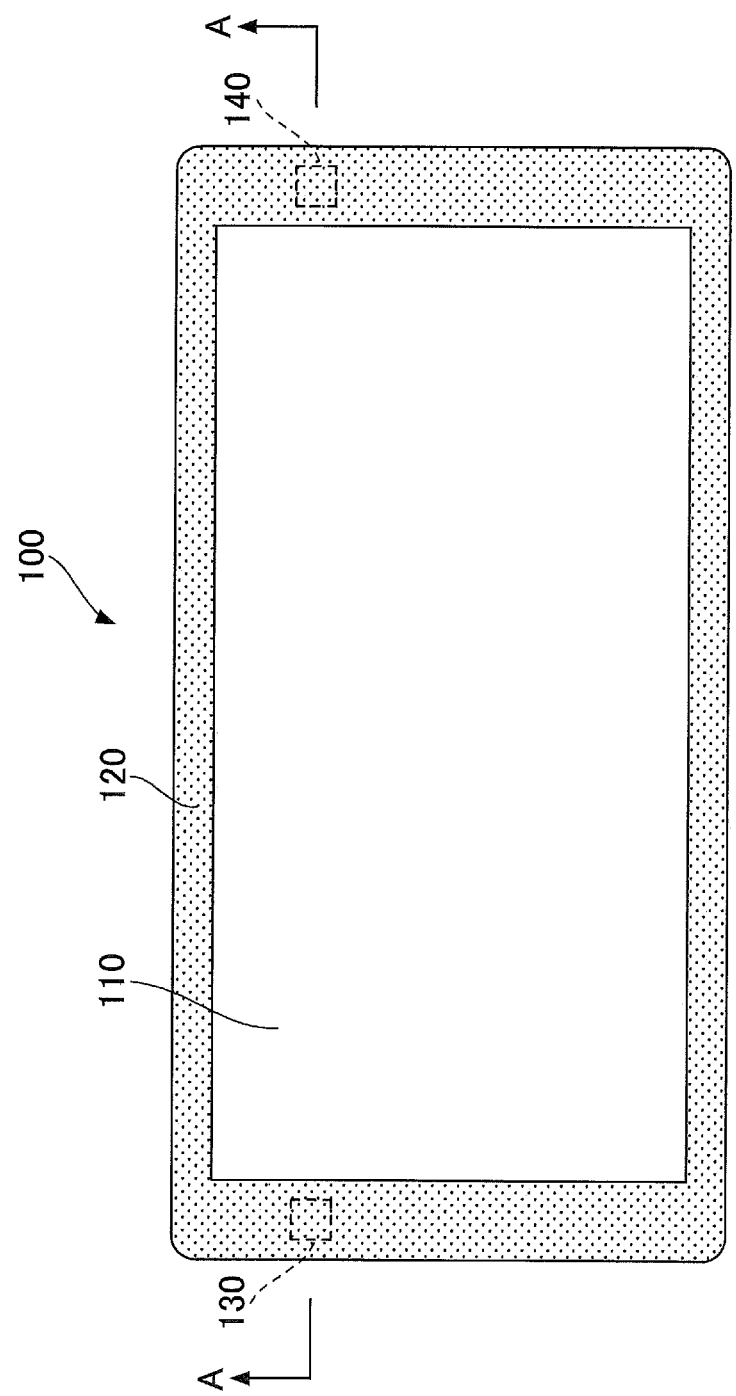
FIG. 1 is a view illustrating an exterior of a display device.

First, an exterior of a display device installed in a vehicle will be described. FIG. 1 is a view illustrating the exterior of the display device. As illustrated in FIG. 1, the display device 100 includes a display region 110 on which an image is displayed by a liquid crystal display module (LCD module) embedded in the display device 100. The display device 100 also includes a non-display region 120 adjacent to the display region 110 (the non-display region 120 is positioned at the periphery in the example illustrated in FIG. 1). An image is not displayed on the non-display region 120.

On the non-display region 120, a first transmitting area 130 is provided on an optical path of infrared light emitted from an IR device (such as an IR LED (Light Emitting Diode)) embedded in the display device 100. Infrared light emitted from the IR device passes through the first transmitting area 130.

Also, on the non-display region 120, a second transmitting area 140 configured to transmit infrared light is provided. Infrared light emitted from the IR device passes through the first transmitting area 130, and is reflected by a reflector. The second transmitting area 140 is disposed on an optical path of the reflected infrared light. The reflected infrared light which has passed through the second transmitting area 140 is received by an IR device embedded in the display device 100 (such as an IR camera). Because of the above described structure of the display device 100, the display device 100 can monitor a condition of a driver of a vehicle using the IR device.

<Internal Structure of Display Device>

Figure 2:
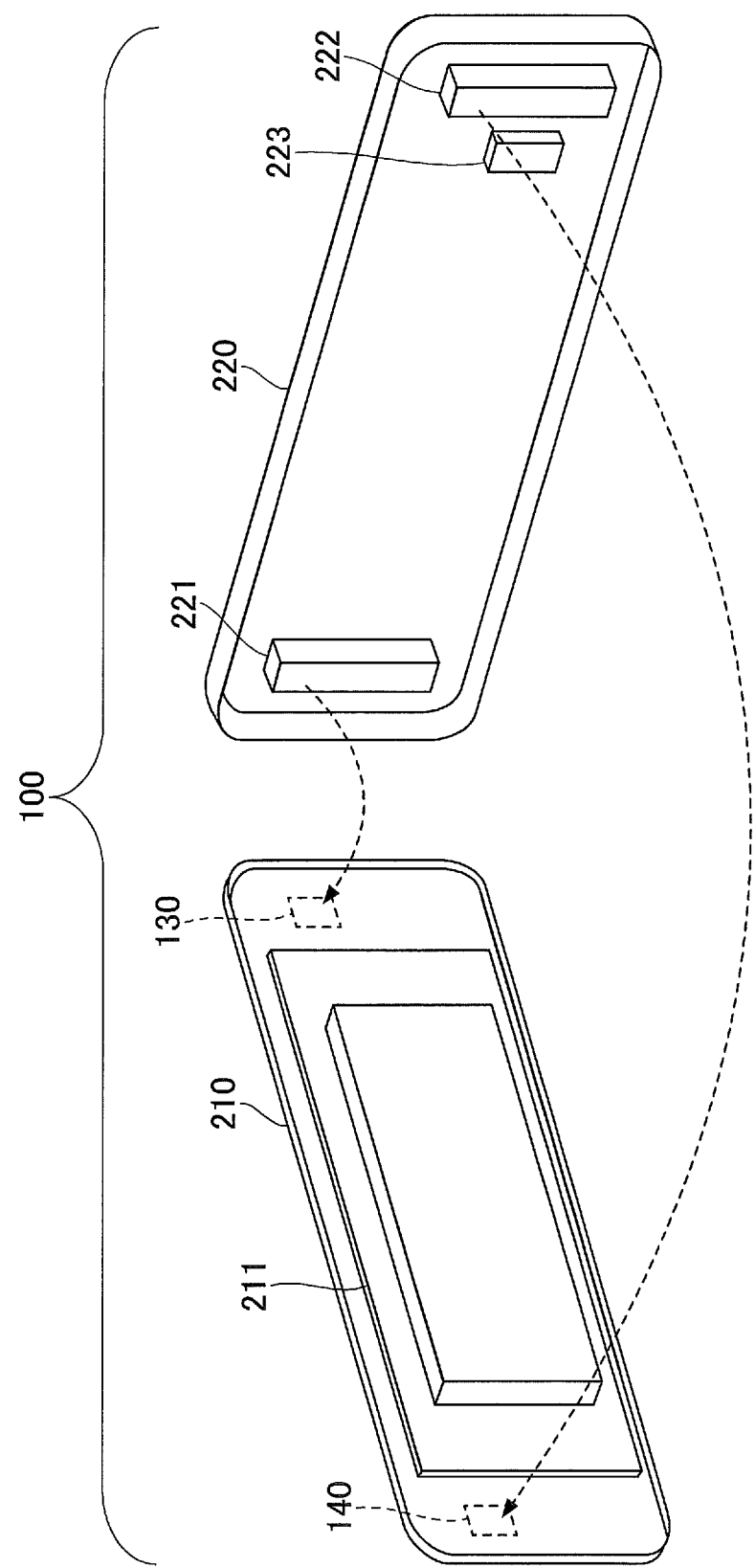
FIG. 2 is a view illustrating an internal structure of the display device.

Next, an internal structure of the display device 100 will be described. FIG. 2 is a view illustrating the internal structure of the display device. As illustrated in FIG. 2, the display device 100 includes a display device front panel 210 and a display device back panel 220.

On a back surface of the display device front panel 210, an LCD module 211 is disposed. The LCD module 211 is fitted to a region corresponding to the display region 110 in FIG. 1.

Note that a region other than the region to which the LCD module 211 is fitted corresponds to the non-display region 120 in FIG. 1. Decorative print is applied to the region corresponding to the non-display region 120 except for an area of optical paths for infrared light. That is, the non-display region 120 includes an area (the first transmitting area 130 and the second transmitting area 140) to which decorative print is not applied, and an area to which decorative print is applied.

Inside the display device back panel 220, an IR LED 221 is provided. The IR LED 221 is fitted to an appropriate position inside the display device back panel 220, such that infrared light emitted from the IR LED 221 can pass through the first transmitting area 130.

Also, inside the display device back panel 220, an IR camera 222 is provided. The IR camera 222 is fitted to an appropriate position inside the display device back panel 220, such that the IR camera 222 can receive infrared light passing through the second transmitting area 140.

Further, inside the display device back panel 220, a control module 223 is provided, which controls emission of infrared light by the IR LED 221 and which processes infrared light received by the IR camera 222 to determine a condition of a driver of a vehicle.

<Optical Members of Display Device>

Next, an example of arrangement of optical members that are disposed on an optical path of infrared light (may also be referred to as an "IR optical path") will be described. Before describing the arrangement with respect to the display device 100, an example of arrangement of optical members that are disposed on an IR optical path of a generic display device will be described, as a comparative example.

(1) Optical Members for a Generic Display Device

Figure 3:
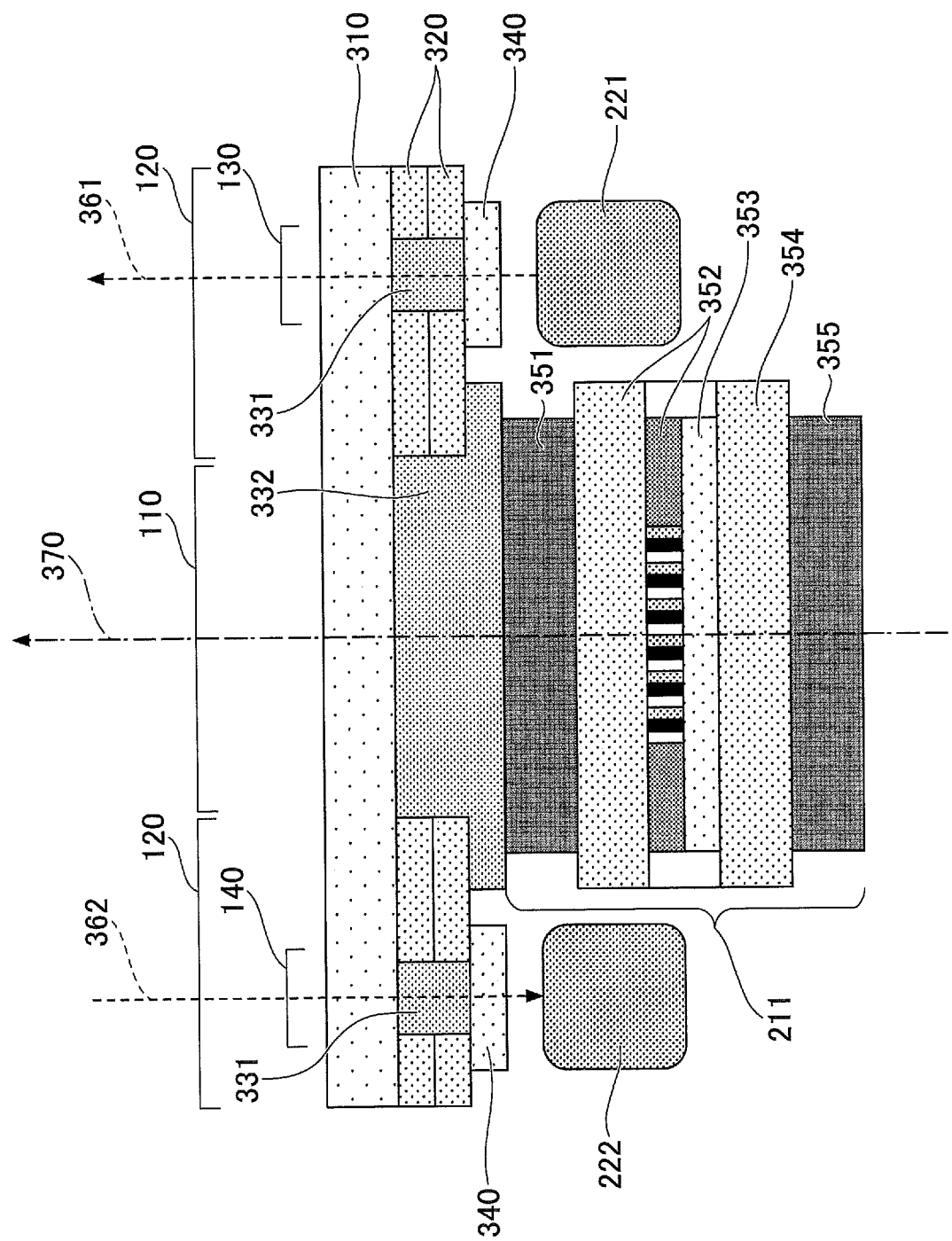
FIG. 3 is a cross-sectional view illustrating an example of arrangement of optical members that are disposed on optical paths of a generic display device.

FIG. 3 is a cross-sectional view illustrating an example of arrangement of optical members that are disposed on optical paths of a generic display device. In FIG. 3, a cross section taken along line A-A in FIG. 1 which is seen from above the display device is illustrated schematically. Note that the generic display device also includes the same components as components included in the display device 100 illustrated in FIG. 1 and FIG. 2. Thus, in the following description, to specify a component (such as an IR LED) in the generic display device, the component will be specified by referring to a reference numeral illustrated in FIG. 1 or FIG. 2.

In FIG. 3, a line 361 represents an optical path of infrared light emitted from an IR LED 221, and a line 362 represents an optical path of reflected IR reflected by a reflector and received by an IR camera 222 (hereinafter, the line 361 may also be referred to as an "IR optical path 361", and the line 362 may also be referred to as an "IR optical path 362").

As illustrated in FIG. 3, in the generic display device, a transparent resin 310, which is an example of a transparent plate, is disposed at the frontmost surface of a display device front panel (the outermost layer of the display device). The transparent resin 310 is formed from, for example, polymethyl methacrylate (PMMA) or polycarbonate (PC).

As mentioned above, decorative print is applied to a region at a back surface side of the transparent resin 310 corresponding to the non-display region 120, except for the first transmitting area 130 and the second transmitting area 140. That is, decorative layers 320 are formed.

Also, an IR plate 340 is fitted to each of the first transmitting area 130 and the second transmitting area 140 at the back surface side of the transparent resin 310, with adhesive 331. An example of the adhesive 331 for fitting the IR plate 340 includes adhesive sheet (such as optically clear adhesive or optically clear resin). Note that the IR plate 340 is an example of an IR filter, which transmits light having not less than a predetermined wavelength (such as infrared light) and which blocks light having less than the predetermined wavelength (such as visible light).

Further, in FIG. 3, a line 370 represents an optical path of visible light emitted from the LCD module 211 (hereinafter, the line 370 may also be referred to as a "visible light optical path 370"). As illustrated in FIG. 3, the LCD module 211 is fitted to a center of the back surface of the transparent resin 310 with adhesive 332, and thereby the display region 110 is formed. Note that the adhesive 332 used here is thicker than the adhesive 331 (material used for the adhesive 332 may be the same as that of the adhesive 331, or may be different).

The LCD module 211 includes a first polarizing plate for display 351, color filters 352, a liquid crystal layer 353, an array substrate 354, and a second polarizing plate for display 355. The periphery of the liquid crystal layer 353 is covered with a seal member, and the liquid crystal layer 353 is disposed between the color filters 352 and the array substrate 354.

(2) Problem of the Generic Display Device

According to the example of arrangement of the optical members in the generic display device illustrated in FIG. 3, because the IR plate 340 blocks visible light, the IR plate 340 can prevent the IR LED 221 or the IR camera 222 from being seen from outside. However, the following problems still remain:

As the IR plate 340 is expensive, the IR plate 340 raises cost of a display device.

As optical characteristics of the optical members disposed on the visible light optical path 370 differ from those of the optical members disposed on the IR optical path 361 or 362, color of the optical members disposed on the visible light optical path 370 is different from color of the optical members disposed on the IR optical path 361 or 362.

Accordingly, if color of the decorative layers 320 is the same as the color of a region including the visible light optical path 370 (which is the display region 110), the color of the decorative layers 320 does not coincide with the color of a region including the IR optical paths 361 and 362 (the first transmitting area 130 and the second transmitting area 140).

Conversely, if the color of the decorative layers 320 is the same as the color of the region including the IR optical paths 361 and 362 (the first transmitting area 130 and the second transmitting area 140), the color of the decorative layers 320 does not coincide with the color of the region including the visible light optical path 370 (which is the display region 110).

That is, the generic display device is expensive. Furthermore, as the generic display device is insufficient in unity of color, appearance characteristics are not good (color of the display region 110 and the non-display region 120 does not coincide, and color in the non-display region 120 is uneven).

Figure 4:
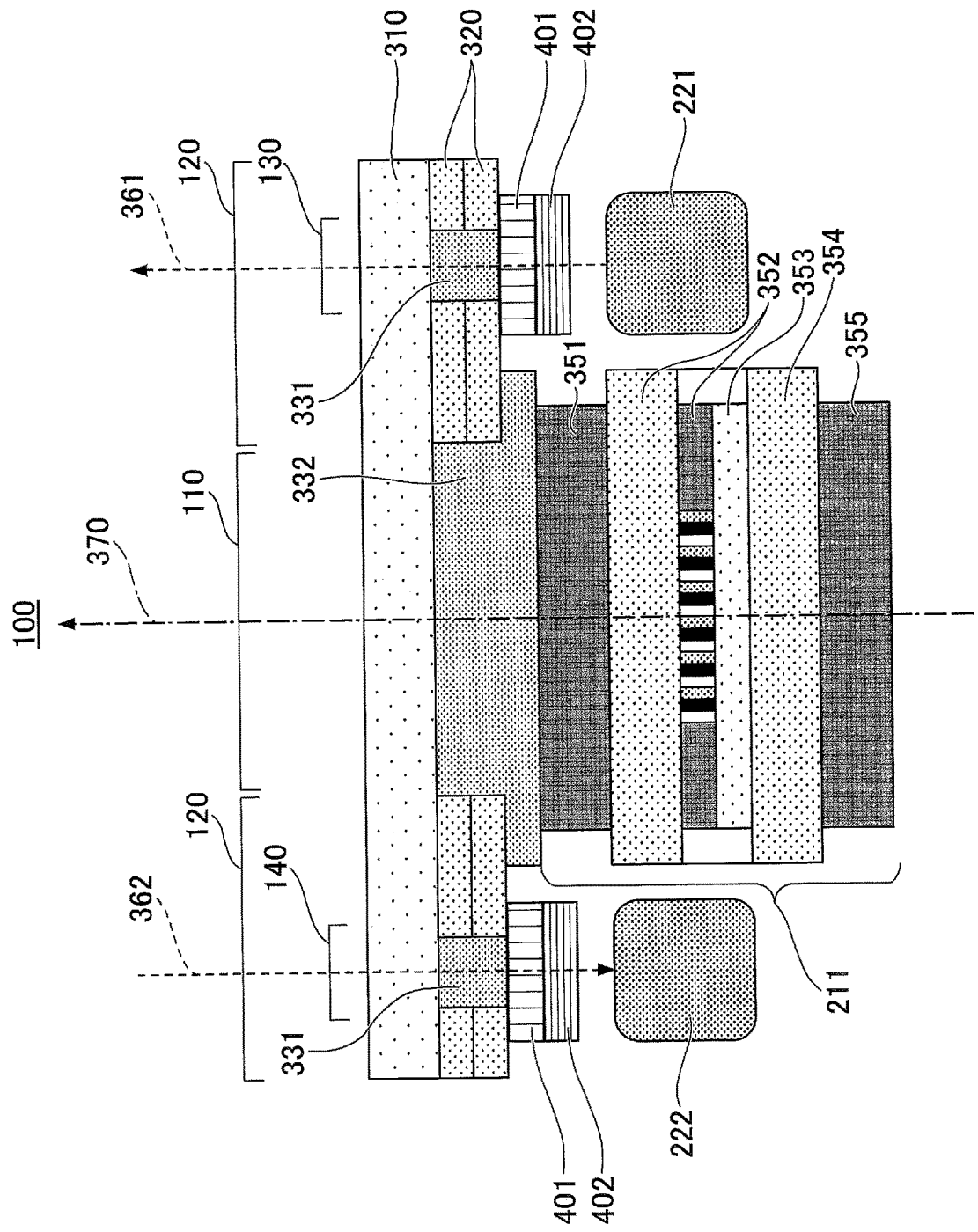
FIG. 4 is a cross-sectional view illustrating an example of arrangement of optical members that are disposed on optical paths of the display device according to a first embodiment.

(3) Optical Members for the Display Device According to the First Embodiment Next, optical members for the display device according to the first embodiment, which solve the above mentioned problems, will be described. FIG. 4 is a cross-sectional view illustrating an example of arrangement of optical members that are disposed on optical paths of the display device according to the first embodiment. Similar to FIG. 3, FIG. 4 schematically illustrates a cross section taken along line A-A in FIG. 1 which is seen from above the display device.

To an optical member in FIG. 4 which is the same as that in FIG. 3, the same reference symbol as that of FIG. 3 is assigned, and description of the optical member will be omitted. The display device illustrated in FIG. 4 is different from the generic display device in FIG. 3 in that a first polarizing plate for IR device 401 that polarizes visible light and a second polarizing plate for IR device 402 that polarizes visible light are provided instead of the IR plate 340.

Similar to the IR plate 340, a set of the first polarizing plate for IR device 401 and the second polarizing plate for IR device 402 is fitted, with adhesive 331, to each of the first transmitting area 130 and the second transmitting area 140 at the back surface side of a transparent resin 310. As described above, to each of the first transmitting area 130 and the second transmitting area 140, decorative print is not applied.

The first polarizing plate for IR device 401 is fitted such that directions of polarization of the first polarizing plate for IR device 401 and the first polarizing plate for display 351 in the LCD module 211 are the same. Thus, when the display device 100 is seen from outside, optical characteristics of a region including the visible light optical path 370 (the display region 110) and a region including the IR optical path 361 or 362 (the first transmitting area 130 or the second transmitting area 140) coincide.

Accordingly, in the display device 100 according to the first embodiment, by adjusting color of the decorative layers 320, color of the display region 110, the first transmitting area 130, the second transmitting area 140, and the decorative layers 320 will be made to be the same. In addition, the first polarizing plate for IR device 401 is inexpensive as compared to the IR plate 340.

That is, cost of the display device 100 according to the first embodiment can be reduced as compared to a generic display device. Further, in the display device 100 according to the first embodiment, unity of color and appearance characteristics can be improved (color of the display region 110 and the non-display region 120 can be made to be the same, and color in the non-display region 120 becomes even).

The second polarizing plate for IR device 402 is fitted such that a direction of polarization of the second polarizing plate for IR device 402 is orthogonal to a direction of polarization of the first polarizing plate for IR device 401 (e.g. such that the angle between each of the polarization directions becomes approximately 90-degrees). Thus, optical characteristics of a set of the first polarizing plate for IR device 401 and the second polarizing plate for IR device 402 can be similar to that of the IR plate 340.

Figure 5:
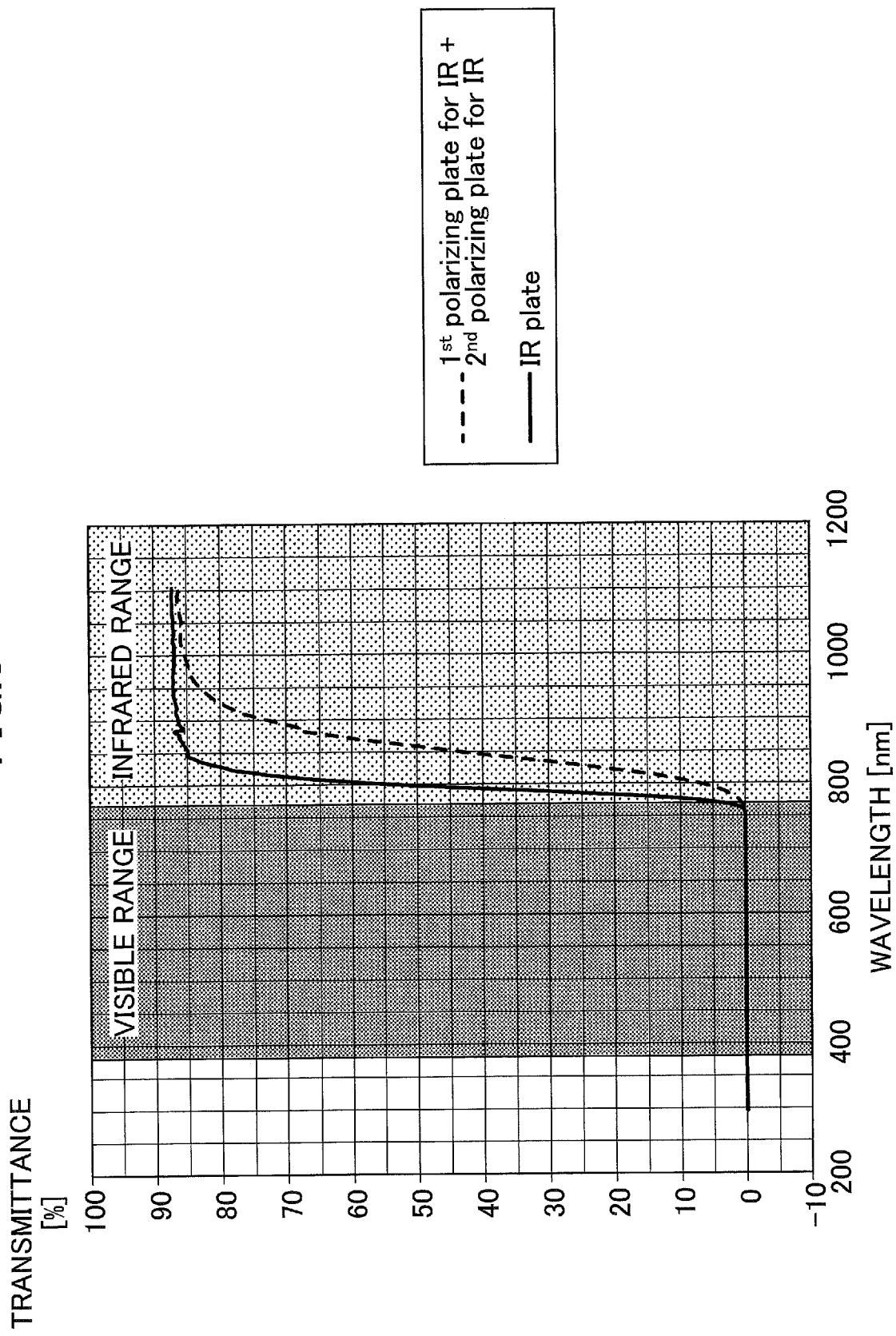
FIG. 5 is a graph illustrating optical characteristics of the optical members disposed on an IR optical path of the display device according to the first embodiment.

(4) Optical Characteristics of the Optical Members Disposed on an IR Optical Path of the Display Device According to the First Embodiment FIG. 5 is a graph illustrating optical characteristics of the optical members disposed on an IR optical path of the display device according to the first embodiment. A horizontal axis of the graph represents a wavelength (nm), and a vertical axis represents a transmittance (%). In FIG. 5, a dotted line represents optical characteristics of an optical member formed by layering the first polarizing plate for IR device 401 and the second polarizing plate for IR device 402, and a solid line represents optical characteristics of the IR plate 340, which is presented as a comparative example.

As can be seen from FIG. 5, by layering the first polarizing plate for IR device 401 and the second polarizing plate for IR device 402, an optical member having substantially the same optical characteristics as the IR plate 340 can be formed.

<Summary>

As is evident from the above description, the display device according to the first embodiment includes the display device front panel and the display device back panel. To the display device back panel, an IR device (such as an IR LED and an IR camera) is fitted.

On the display device front panel, there are a display region on which an image is displayed by a liquid crystal display module (LCD module), and a non-display region provided at the periphery of the display region, on which an image is not displayed.

The display device front panel includes a transparent resin. On a region of a back surface of the transparent resin corresponding to the non-display region except for an area for an IR optical path, a decorative layer is formed by applying decorative print.

On an area including the IR optical path (a first transmitting area and a second transmitting area) at the back surface side of the transparent resin, a first polarizing plate for IR device is provided.

The first polarizing plate for IR device is disposed such that a direction of polarization of the first polarizing plate for IR device is the same as that of a first polarizing plate for display used for the LCD module.

Further, a second polarizing plate for IR device is layered on the first polarizing plate for IR device, such that a direction of polarization of the second polarizing plate for IR device is orthogonal to a direction of polarization of the first polarizing plate for IR device.

Accordingly, in the display device according to the first embodiment, by adjusting the color of the decorative layers, the color of the display region, the first transmitting area, the second transmitting area, and the decorative layers can be made to be the same. That is, unity of color can be improved (the color of the display region and the non-display region can be made to be the same, and the color in the non-display region becomes even). As a result, according to the first embodiment, appearance characteristics of a display device embedding an IR device can be improved.

Second Embodiment

In the first embodiment, the first polarizing plate for display 351 and the second polarizing plate for display 355 in the LCD module 211, and the first polarizing plate for IR device 401 and the second polarizing plate for IR device 402 are separate components. However, an arrangement method of the first polarizing plate for IR device 401 and the second polarizing plate for IR device 402 is not limited to the above described method. For example, the first polarizing plate for IR device 401 and the second polarizing plate for IR device 402 may be common to the first polarizing plate for display 351 and the second polarizing plate for display 355 in the LCD module 211.

Figure 6:
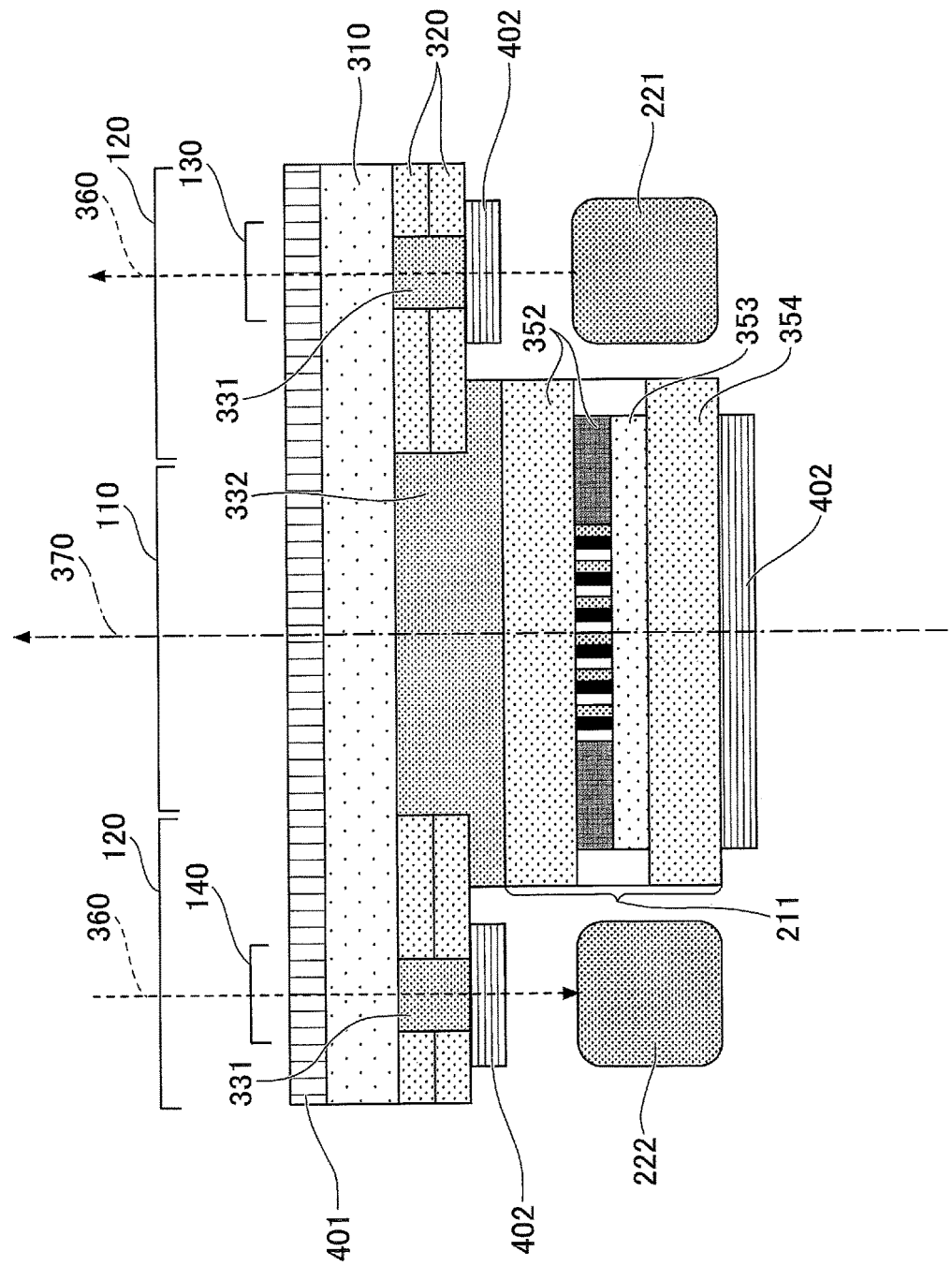
FIG. 6 is a cross-sectional view illustrating an example of arrangement of optical members that are disposed on optical paths of a display device according to a second embodiment.

FIG. 6 is a cross-sectional view illustrating an example of arrangement of optical members that are disposed on optical paths of a display device according to a second embodiment. What is different from FIG. 4 is the following:

The first polarizing plate for display 351 in the LCD module 211 (a polarizing plate having been provided at a side of the transparent resin 310 in the first embodiment) is not provided.

A first polarizing plate for IR device 401 is provided on an entire front surface of the transparent resin 310. Note that the first polarizing plate for IR device 401 has the same optical characteristics as that of the first polarizing plate for display 351 (in the first embodiment), or is formed of the same material as that of the first polarizing plate for display 351.

According to the arrangement method illustrated in FIG. 6, similar effect to the first embodiment can be obtained. In addition, according to the arrangement method illustrated in FIG. 6, a borderline between the decorative layers 320 and the first transmitting area 130, or a borderline between the decorative layers 320 and the second transmitting area 140 is less conspicuous. Thus, unity of color can be further improved.

Third Embodiment

In the second embodiment, the first polarizing plate for IR device 401 is provided on an entire front surface of the transparent resin 310. However, an arranging method of the first polarizing plate for IR device 401 is not limited to the above mentioned method. For example, the first polarizing plate for IR device 401 may be disposed at an entire back surface of the transparent resin 310.

Figure 7:
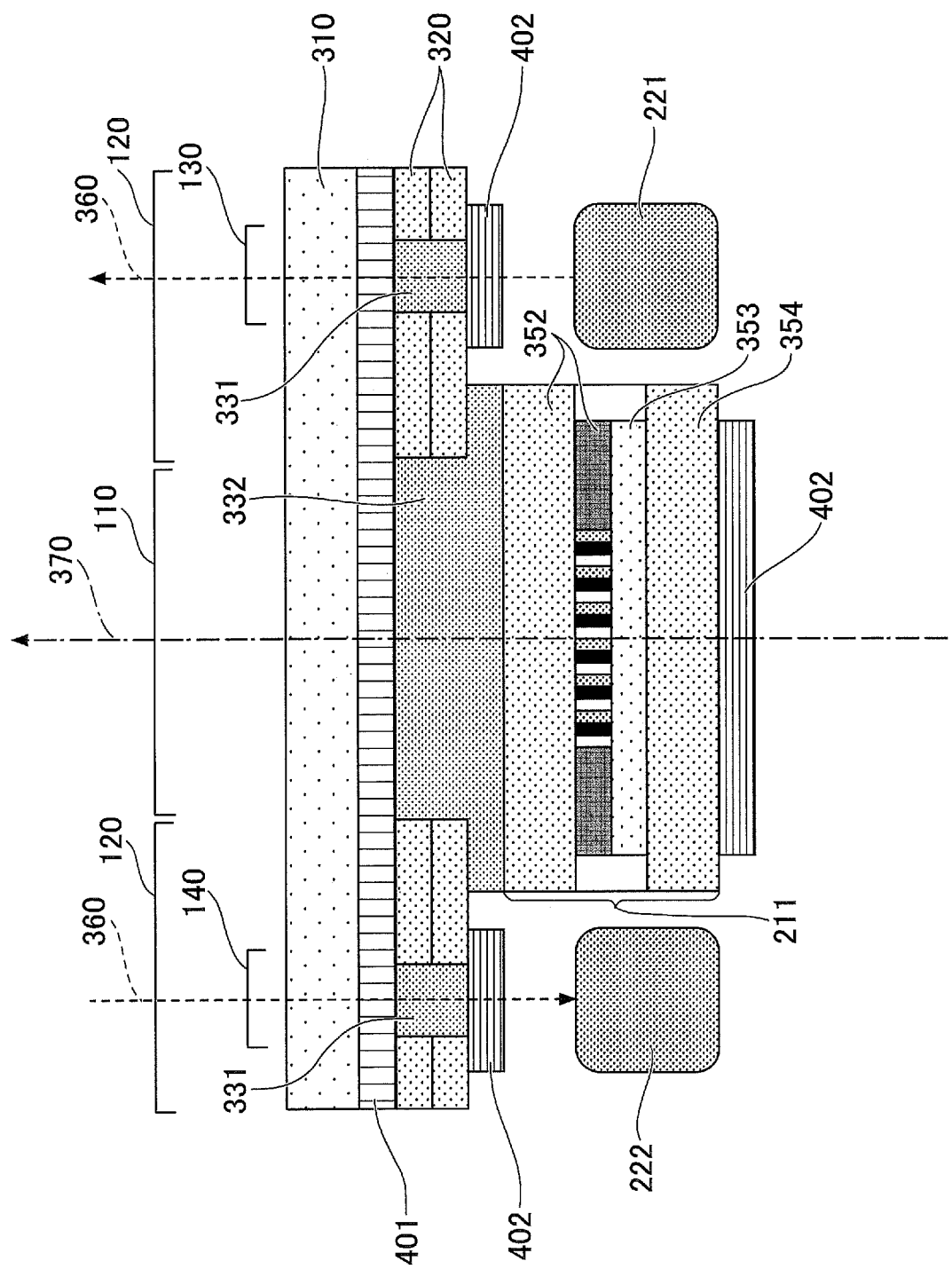
FIG. 7 is a cross-sectional view illustrating an example of arrangement of optical members that are disposed on optical paths of a display device according to a third embodiment.

FIG. 7 is a cross-sectional view illustrating an example of arrangement of optical members that are disposed on optical paths of a display device according to a third embodiment. What is different from FIG. 6 is that:

A first polarizing plate for IR device 401 is provided on an entire back surface of the transparent resin 310. Note that the first polarizing plate for IR device 401 has the same optical characteristics as that of the first polarizing plate for display 351 (in the first embodiment), or is formed of the same material as that of the first polarizing plate for display 351.

According to the arrangement method illustrated in FIG. 7, similar effect to the first or second embodiment can be obtained. In addition, according to the arrangement method illustrated in FIG. 7, scratch resistance can be improved.

Other Embodiments

In the above described first to third embodiments, a case, in which an arranging method is applied to a display device installed in a vehicle, is described. However, the above described methods can be applied to other display devices installed in a moving body other than a vehicle, as long as the display device embeds an IR device.

Further, in the first to third embodiments, the first transmitting area 130 and the second transmitting area 140 are respectively disposed at a right side of the non-display region 120 located on a right of the display region 110 and at a left side of the non-display region 120 located on a left of the display region 110. However, an arrangement of the first transmitting area 130 and the second transmitting area 140 is not limited to the above method. For example, the first transmitting area 130 and the second transmitting area 140 are respectively disposed at an upper side of the non-display region 120 located on an upper side of the display region 110 and a lower side of the non-display region 120 located on a lower side of the display region 110. Further, the first transmitting area 130 and the second transmitting area 140 are not required to be disposed separately at both sides of the display region 110, but may be disposed adjacently with each other.

Further, the present invention is not limited to the specific embodiments described above. Various changes can be made hereto within the scope of the present invention, and may be appropriately made according to applications.

What is claimed is:

1. A front panel for a display device, the display device including a display region and a non-display region adjacent to the display region, the front panel for the display device comprising:
   a transparent plate;
   a decorative layer formed on an area of a back surface of the transparent plate corresponding to the non-display region except for an area of an optical path of infrared light;
   a first polarizing plate polarizing visible light provided at a front surface side or a back surface side of the transparent plate, the first polarizing plate being disposed at a region including the optical path of infrared light; and
   a second polarizing plate polarizing visible light provided at the back surface side of the transparent plate, the second polarizing plate being located at the region including the optical path of infrared light such that a polarization direction of the first polarizing plate is different from a polarization direction of the second polarizing plate; wherein
   a color of the decorative layer is determined such that the display region and the non-display region are seen in the same color, when seen from an outside of the display device.

2. The front panel for the display device according to claim 1, wherein the polarization direction of the first polarizing plate is orthogonal to the polarization direction of the second polarizing plate.

3. The front panel for the display device according to claim 1, wherein
   the first polarizing plate is provided at the back surface side of the transparent plate, and
   the second polarizing plate is layered on the first polarizing plate.

4. The front panel for the display device according to claim 1, wherein
   the first polarizing plate is provided such that an entire surface of the transparent plate is covered with the first polarizing plate, and
   the second polarizing plate is disposed in a region corresponding to the non-display region including the optical path of infrared light.

5. The front panel for the display device according to claim 3, wherein optical characteristics of the first polarizing plate are same optical characteristics as a polarizing plate of a liquid crystal display module fitted to the display region.

6. A display device comprising:
   a front panel including
      a transparent plate,
      a decorative layer formed on an area of a back surface of the transparent plate corresponding to a non-display region of the display device except for an area of an optical path of infrared light,
      a first polarizing plate polarizing visible light provided at a front surface side or a back surface side of the transparent plate, the first polarizing plate being disposed at a region including the optical path of infrared light, and a second polarizing plate polarizing visible light provided at the back surface side of the transparent plate, the second polarizing plate being located at the region including the optical path of infrared light such that a polarization direction of the first polarizing plate is different from a polarization direction of the second polarizing plate;

a back panel; and an infrared device disposed at a location corresponding to the optical path of infrared light on the back panel; wherein a color of the decorative layer is determined such that the display region and the non-display region are seen in the same color, when seen from an outside of the display device.

* * * * *